United States Patent
Martin

(10) Patent No.: US 10,372,016 B2
(45) Date of Patent: Aug. 6, 2019

(54) METHOD AND SYSTEM FOR ASSISTING SECURITY CAMERA FOCUSING

(71) Applicant: Sensormatic Electronics, LLC, Boca Raton, FL (US)

(72) Inventor: Walter A. Martin, Ballymena (GB)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 906 days.

(21) Appl. No.: 13/768,210

(22) Filed: Feb. 15, 2013

(65) Prior Publication Data

US 2014/0232860 A1 Aug. 21, 2014

(51) Int. Cl.
*G03B 3/00* (2006.01)
*H04N 5/232* (2006.01)
*H04N 7/18* (2006.01)

(52) U.S. Cl.
CPC ............ *G03B 3/00* (2013.01); *H04N 5/23206* (2013.01); *H04N 5/23212* (2013.01); *H04N 7/181* (2013.01)

(58) Field of Classification Search
CPC ......... H04N 5/232; H04N 7/181; H04N 7/183
USPC .......... 348/143, 211.3, 345, E5.045, E5.043, 348/153, 159, 211.11
See application file for complete search history.

(56) References Cited

U.S. PATENT DOCUMENTS

| 7,015,954 B1* | 3/2006 | Foote .................... G06T 3/4038 348/218.1 |
| 7,248,301 B2* | 7/2007 | Voss .................... H04N 5/23212 348/333.04 |
| 2007/0291115 A1* | 12/2007 | Bachelder ........ G08B 13/19621 348/143 |
| 2010/0220202 A1* | 9/2010 | Roskowski ........ H04N 5/23206 348/211.3 |

FOREIGN PATENT DOCUMENTS

| EP | 1347639 A1 | 9/2003 |
| EP | 1555558 A1 | 7/2005 |
| JP | 2011170118 A | 9/2011 |

OTHER PUBLICATIONS

International Search Report and Written Opinion of the International Searching Authority, dated Apr. 8, 2014, from counterpart International Application No. PCT/US2013/075985, filed Dec. 18, 2013.
International Preliminary Report on Patentability, dated May 11, 2015, from counterpart International Application No. PCT/US2013/075985, filed Dec. 18, 2013.

\* cited by examiner

*Primary Examiner* — Jefferey F Harold
*Assistant Examiner* — Omer Khalid
(74) *Attorney, Agent, or Firm* — HoustonHogle LLP

(57) ABSTRACT

A system and method for installing security cameras on a security network of a security system. The security cameras include an autofocus routine, manually adjustable lenses, and feedback mechanisms. The autofocus routine calculates (Continued)

the degree to which the field of view is out of focus and the feedback mechanism provides feedback to the installer during installation. In response to the feedback from the feedback mechanism, the installer manually adjusts the lens of security camera.

1 Claim, 6 Drawing Sheets

METHOD AND SYSTEM FOR ASSISTING SECURITY CAMERA FOCUSING

BACKGROUND OF THE INVENTION

Security systems are often implemented in schools, government buildings, and corporate offices. These security systems are comprised of security devices such as security cameras, door controllers, access control readers, video servers, access control panels, intrusion panels, and elevator control systems, to list a few examples.

Generally, these security devices are used to monitor locations around office buildings. Typically, the security devices are connected to a security network and are controlled by a control system.

The installation of security devices is often complicated and time consuming. An installer has to identify desired locations throughout the office building, physically mount the security devices, supply power to the security devices, and connect all of the security devices to the security network. In many cases, connecting the security devices to the security network requires running data cables from data transmission devices (e.g., panels, routers, switches, and hubs) to all of the security devices.

After the physical installation of the security devices, the installer must then configure each security device for communication with the control system. Security cameras, for example, must be aimed to capture images of the desired field of view and then they must be focused.

SUMMARY OF THE INVENTION

Previously, the focusing of the security cameras was performed by an installer over the security network. However, the latency of the data transferred over the security network and the low frame rates of high megapixel security cameras created problems of overshoot and/or undershoot when focusing the security cameras.

One proposed solution for focusing the security cameras was to equip the security cameras with motorized lenses and an autofocus routine. The autofocus routine calculated whether the field of view was out focus and then instructed the motorized lens to adjust the focus until the view of view was in focus. This solution, however, was expensive and increased the total cost of each security camera.

This present solution is directed to security cameras that are manually adjusted by the installer during installation, for example. The security cameras utilize the autofocus routine (sometimes called an electronic rangefinder) to calculate the degree to which the field of view is out of focus, but instead of controlling a motorized lens, the autofocus routine controls a feedback mechanism that provides feedback to the installer. The feedback from security camera enables the installer to manually adjust the focus until the security camera is in focus. Once the security camera is in focus, the feedback mechanism can provide an indication to the installer to permanently set the focus of the security camera.

In general, according to one aspect, the invention features a method for installing a security camera. The method comprises an installer installing the security camera at a desired location, the installer initiating an autofocus routine on the security camera, determining a degree to which the camera is out of focus, providing feedback to the installer on the degree to which the camera is out of focus, and the installer adjusting the focus of a lens based on the feedback.

In embodiments, the feedback to the installer is provided by a light source that flashes at a frequency based on the degree to which a field of view is out of focus. In other cases, the feedback is provided by a speaker that plays a tone for a length of time based on the degree to which a field of view is out of focus.

Typically, the security camera resides on a security network with at least one additional security camera, and the security network is a public data network, a private data network, a bus network, or the Internet.

In one embodiment, the autofocus routine is executing on the security camera.

In general, according to another aspect, the invention features a security camera comprising a security camera body, a lens installed within a lens body, the lens body being coupled to the security camera body, a lens focusing mechanism to adjust focus, and a feedback mechanism that provides feedback to an installer indicating a degree to which the security camera is out of focus.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items.

Further, the singular forms of the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
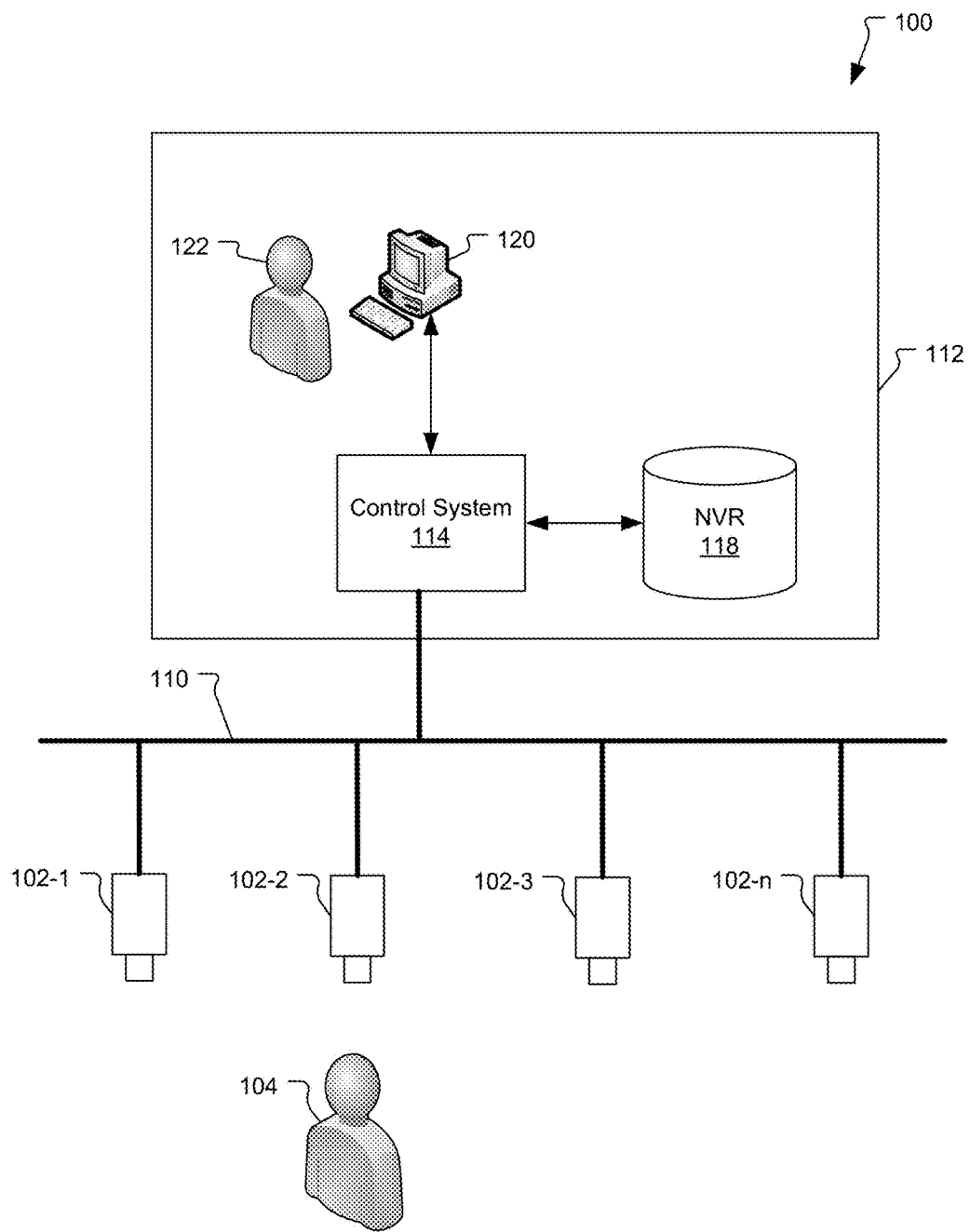
FIG. 1 is a schematic diagram of a security system including security cameras that are installed on a security network.

FIG. 1 is a schematic diagram of a security system 100 showing security cameras 102-1 to 102-n installed on a security network 110.

In a typical implementation, the security cameras 102-1 to 102-n capture video images and generate video data in real time as a live feed. In an alternative embodiment, the security cameras 102-1 to 102-n may record the video data as a series of still images captured at predefined intervals. In some embodiments, the security cameras 102-1 to 102-n capture the video data in high definition (HD).

In general, there are many different types of security cameras and many different features available for different installation needs. For example, there are security cameras that only capture video in black and white, security cameras that capture video in color, security cameras that capture infrared (or thermal) video, and security cameras that utilize other night vision technology to operate in low light situations.

In the illustrated embodiment, the security cameras 102-1 to 102-n are connected to the security network 110 of the security system 100. The security network 110 is typically a public data network (e.g., the Internet), a private data network (e.g., local area network) and/or combination of those networks. In some embodiments, the security network 110 includes wireless portions.

Typically, the security system 100 includes additional security devices (not shown) such as access control panels, video servers, intrusion panels, access control readers, elevator control systems, motion sensors, door controllers, smoke detectors, and fire alarms, to list a few examples. These security devices (and security cameras 102-1 to 102-n) are monitored by a control system 114, which is housed in a control room 112. Generally, the control room 112 also houses a network video recorder 118 and a workstation 120.

The control system 114 monitors and controls the security cameras 102-1 to 102-n via the security network 110. The video data captured by the security camera 102-1 to 102-n is stored in the network video recorder and the control system 114 typically adds time and date information to allow the video data to be indexed and reviewed at a later date. The database 116 typically stores configuration information for security cameras 102-1 to 102-n and possibly employee information such as names, addresses, phone numbers, electronic mail address, and job titles, for example.

The workstation 120 enables a user 122 to view the video data captured by the security cameras 102-1 to 102-n and monitor the performance of the control system 114 and network video recorder 118.

Figure 2A:
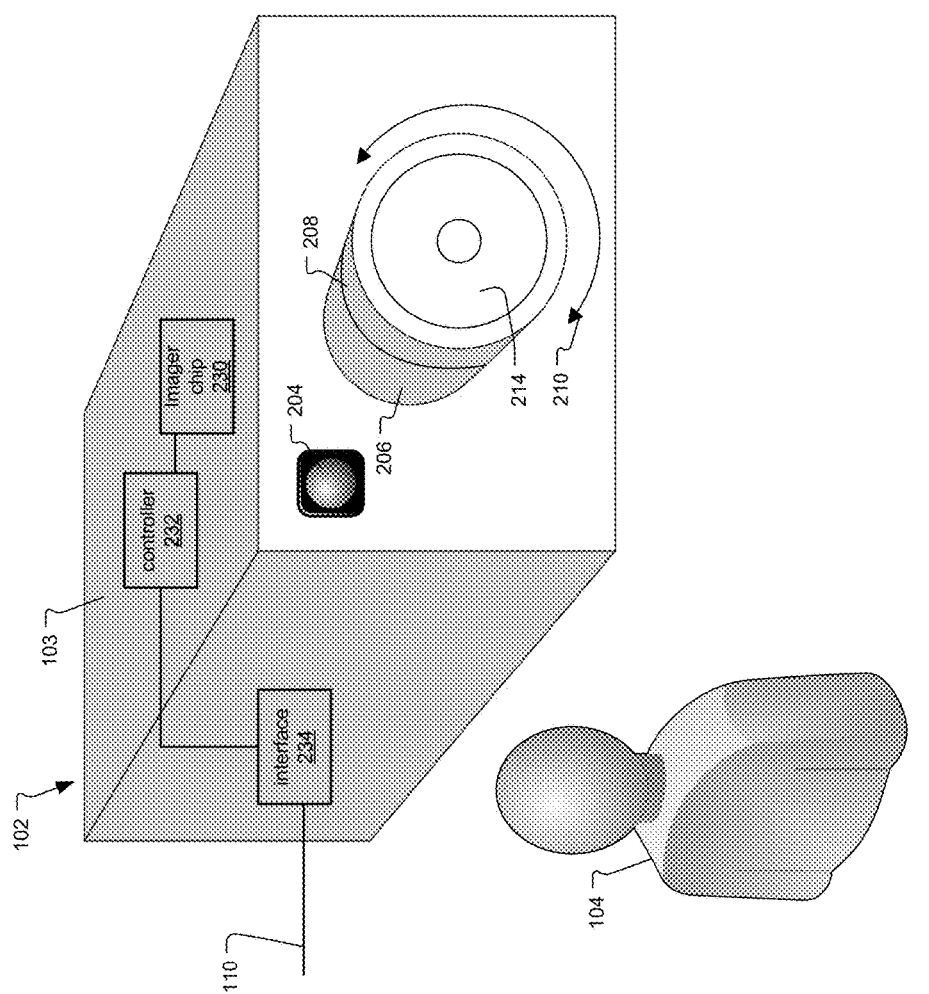
FIG. 2A is a perspective schematic view of a security camera that includes a feedback mechanism, which provides feedback to the installer.

FIG. 2A is a perspective view of a security camera 102 that includes a feedback mechanism, which provides feedback to the installer 104, according to the present invention.

In the illustrated example, the security camera 102 includes a security camera body 103, a lens body 206, a lens 214, a focusing mechanism 208, and a feedback mechanism (e.g., light source 204).

The security camera body 103 houses and protects internal components of the security camera 102 such as an imager chip 230 on which the lens 214 creates an image of the camera's field of view, a controller 232, and network interface 234, to list a few examples. Typically, the security camera body 103 is fabricated from durable materials (e.g., aluminum, alloys, and/or plastics) and is designed to withstand varying weather conditions because the security cameras are often installed outdoors and are exposed to the elements.

The lens body 206 is coupled to the camera body 103. Typically, the lens body 206 is fabricated from similar materials as the camera body 103 (e.g., aluminum, alloys, and/or plastics) to protect the lens 214. The lens body 214 further includes a manually operated focusing mechanism 208, such as a focusing ring, that enables the installer 104 to adjust the focus of the lens 214. In the illustrated example, the focusing mechanism 208 is a focusing ring, which enables the installer to manually adjust the focus by turning the focusing mechanism 208 in a clockwise or counterclockwise direction 210.

In general, different security cameras implement different types of lenses based on the desired installation location and the area that needs to be monitored. For example, some different lenses include fish-eye, wide angle, panoramic, zoom, super wide, pancake, and macro lenses, to list a few examples. The different lenses enable the security cameras 102-1 to 102-n to capture different fields of view.

The security camera 102 includes a feedback mechanism (e.g., a light source 204) that provides feedback to the installer 104 based on the degree to which the field of view is out of focus. In the illustrated example, the feedback mechanism (i.e., the light source 204) is a light emitting diode.

Figure 2B:
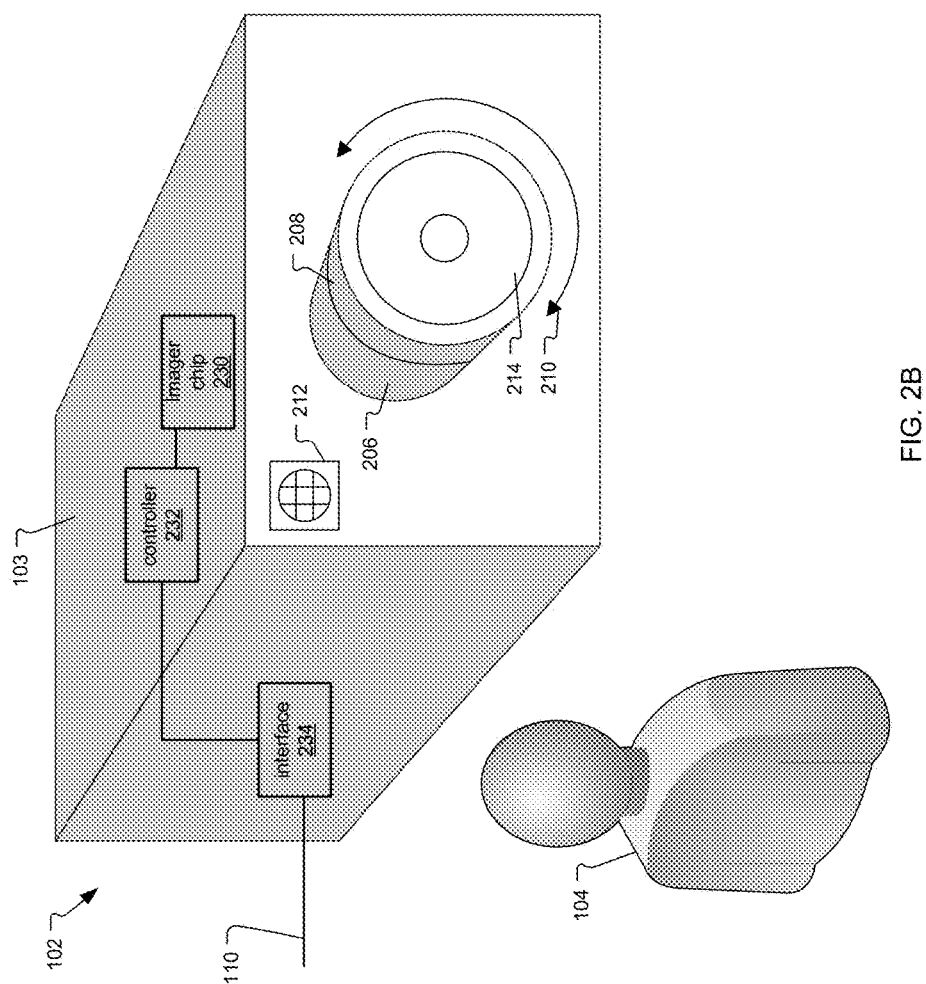
FIG. 2B is a perspective schematic view of the security camera and includes an alternative feedback mechanism.

FIG. 2B is a perspective view of the security camera 102 and includes an alternative feedback mechanism.

In the illustrated example in FIG. 2B is nearly identical to FIG. 2A. In this embodiment, however, the feedback mechanism is a speaker 212 that plays an audible tone based on the degree to which the field of view is out of focus.

While FIGS. 2A and 2B only illustrate two examples of feedback mechanisms, it will be understood by those skilled in the art that other feedback mechanisms could also be integrated into the security camera 102.

Figure 3:
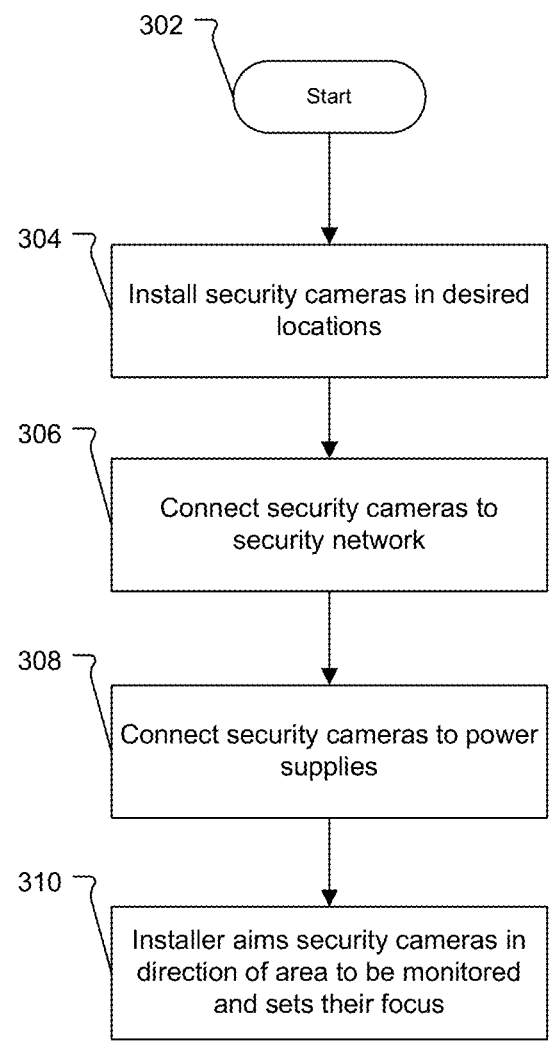
FIG. 3 is a flowchart illustrating the steps performed to install security cameras on the security network of the security system.

FIG. 3 is a flowchart illustrating the steps performed by an installer 104 to install security cameras 102-1 to 102-n on the security network 110 of the security system 100.

In the first step 304, the security cameras 102-1 to 102-n are physically installed in desired locations around the office building. Typically, the desired locations are entry/exit points of building, lobbies (or waiting areas), parking lots (or garages), load/unloading zones, and restricted areas within the office building, to list a few examples.

In the next step 306, the security cameras 102-1 to 102-n are connected to the security network 110 of the security system 100. Typically, the security cameras 102-1 to 102-n are connected via data transmission cables. Alternatively, some the security cameras 102-1 to 102 are able to transmit video data wirelessly.

In the next step 308, the security cameras 102-1 to 102-n are connected to power supplies. Lastly, in step 310, the installer 104 aims the lenses of the security cameras 102-1 to 102-n in the direction of the area(s) to be monitored. In some embodiments, this step further includes selecting an area of interest in the image from the camera that will be used for focus. This is performed at the workstation 120 using a graphical user interface tool that allows the operator 122 to designate a portion of the area of the image from the camera.

Figure 4A:
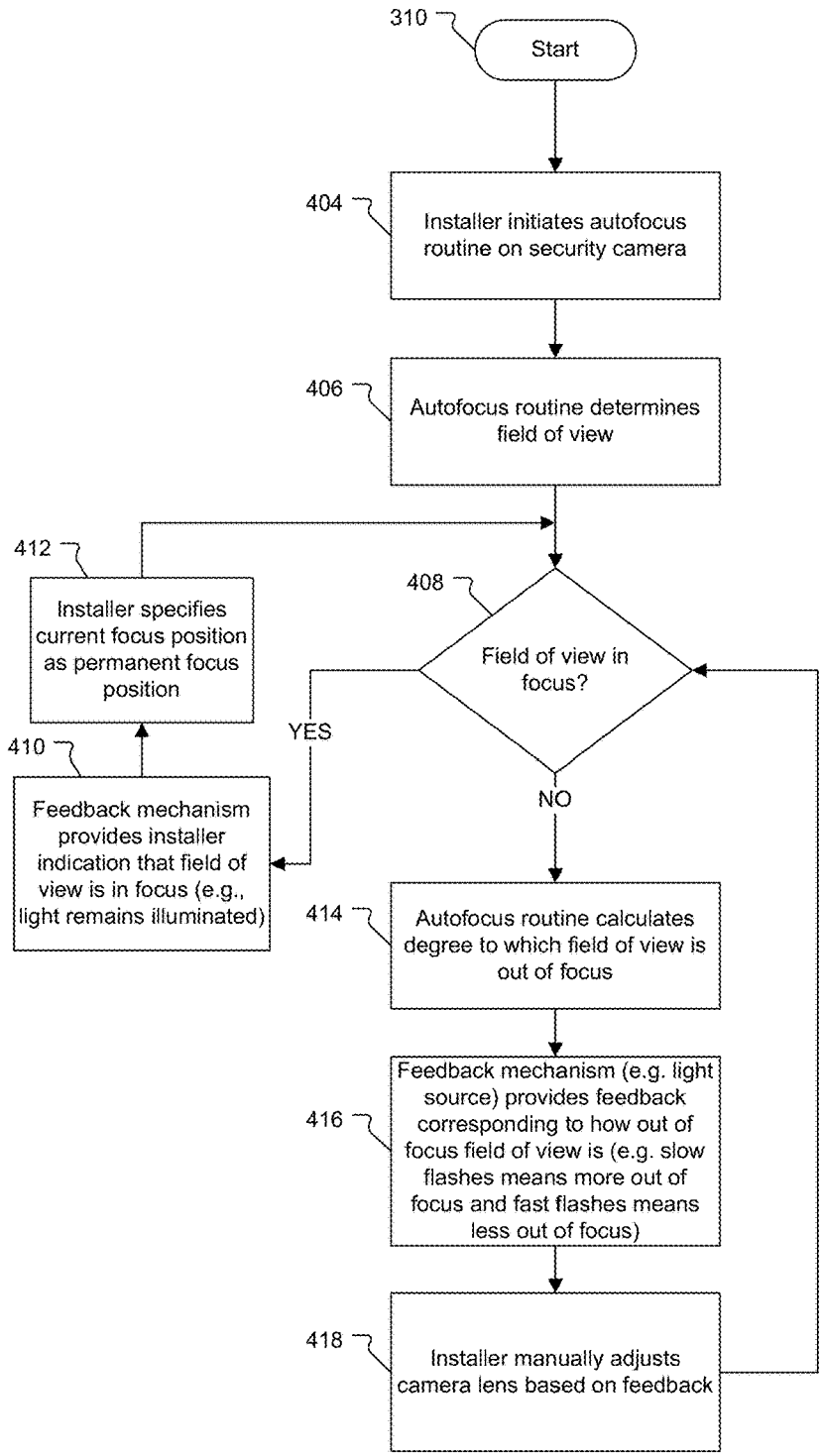
FIG. 4A is a flowchart illustrating the steps to manually adjust the focus of the security cameras based on feedback from the feedback mechanism.

FIG. 4A is a flowchart illustrating the details of the focus adjustment 310 for the installer 104 to manually adjust the focus of the security camera 102 based on feedback from the feedback mechanism (e.g., light source 204).

In the first step 404, the installer 104 initiates the autofocus routine running on the controller 232 on the security camera 102. In the next step 406, the autofocus routine analyzes the image captured by the imager chip 230 and determines the field of view of the security camera 102 and possibly the area of interest. In the next step 408, the autofocus routine determines if the field of view and/or area of interest is in focus. If the field of view is in focus, then the feedback mechanism (e.g., light source 204) of the security camera 102 provides an indication to the installer 104 that field of view is in focus (e.g., light 204 remains illuminated) in step 410. In the next step 412, the installer 104 should then specify the current focus position as the permanent focus position.

At least initially, the field of view and/or area of interest are typically not in focus in step 408. Then the autofocus routine executing on the controller 232 calculates the degree to which the field of view is out of focus in step 414. In the next step 416, the feedback mechanism (e.g., light source 204) provides feedback corresponding to the degree to which field of view is out of focus. In a current implementation, a slow flashing light means the security camera 102 is more out of focus and a fast flashing light means the security camera is less out of focus. In the next step 418, the installer 104 manually adjusts the lens 214 via the focusing mechanism 208 based on feedback from light source 204.

Figure 4B:
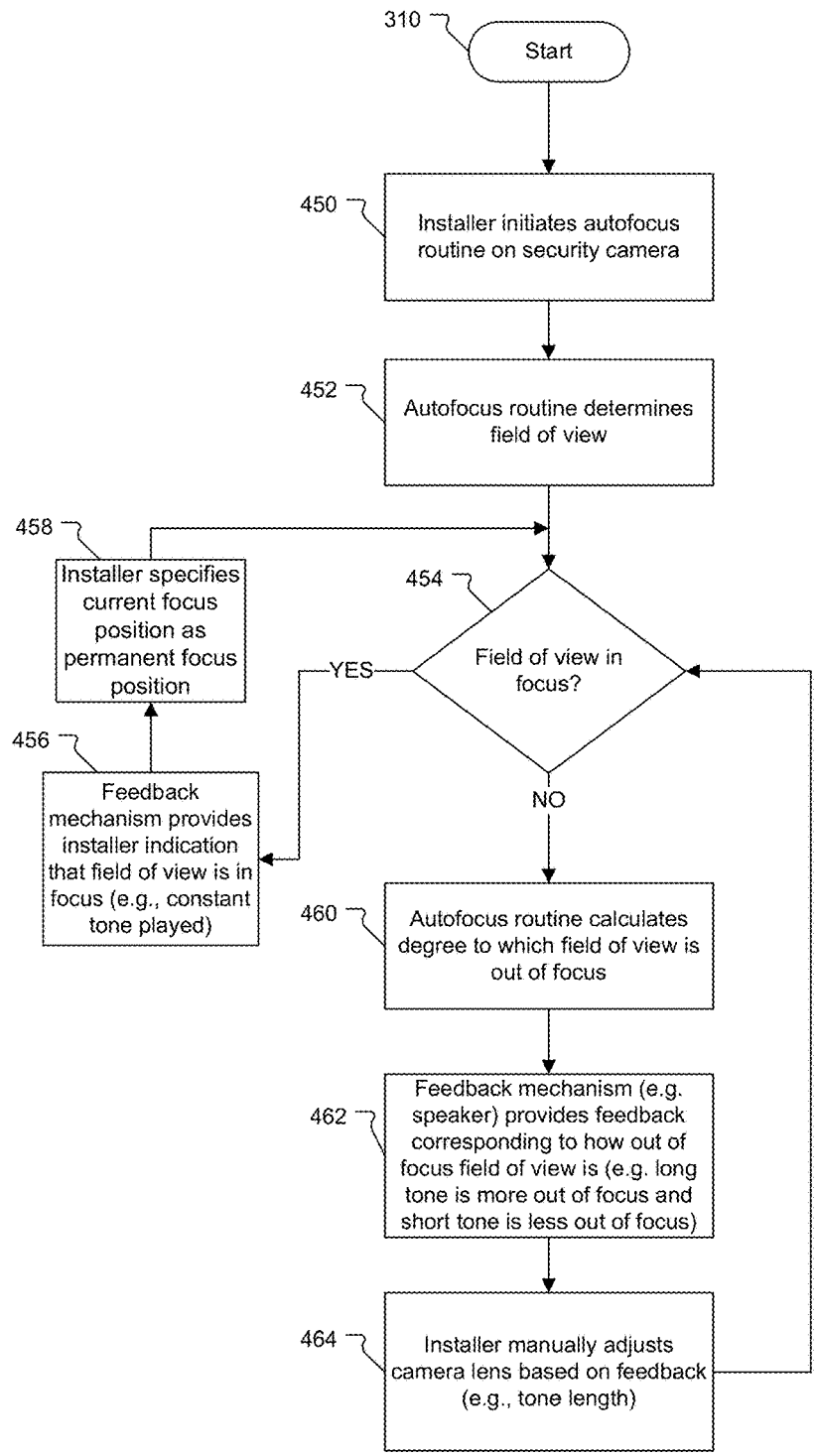
FIG. 4B is a flowchart illustrating the steps to manually adjust the focus of the security cameras based on an alternative feedback mechanism.

FIG. 4B is a flowchart illustrating the steps for the installer 104 to manually adjust the focus of the security cameras 102-1 to 102-n based on an alternative feedback mechanism (e.g., a speaker 212).

In the illustrated example, steps 450 through 464 are nearly identical to steps 404 to 418 (of FIG. 4A). In this embodiment, however, the feedback mechanism is the speaker 212. Rather than flashing a light source to provide feedback to the installer 104, the speaker 212 plays a tone for a length of time or a pitch corresponding to how out of focus the field of view is (e.g. long tone is more out of focus and short tone is less out of focus).

While this invention has been particularly shown and described with references to preferred embodiments thereof, it will be understood by those skilled in the art that various changes in form and details may be made therein without departing from the scope of the invention encompassed by the appended claims.

What is claimed is:

1. A security camera comprising: a security camera body;
a lens installed within a lens body, the lens body being coupled to the security camera body;
an imager chip on which the lens forms an image;
a focusing mechanism to adjust focus of the lens,
a controller of the security camera executing an autofocus routine, the autofocus routine analyzing an image captured by the imager chip and determining a degree to which the image is out of focus;
a feedback mechanism providing feedback corresponding to the degree to which the image is out of focus for an installer enabling the installer to adjust the focusing mechanism based on the feedback; and
a workstation having a graphical user interface tool that allows an operator to designate a portion of the image from the security camera as an area of interest, wherein the feedback mechanism provides the installer with indications of the degree to which the area of interest is out of focus.

* * * * *